US008628277B2

(12) United States Patent
Pei

(10) Patent No.: US 8,628,277 B2
(45) Date of Patent: Jan. 14, 2014

(54) CUTTING APPARATUS

(75) Inventor: Shao-Kai Pei, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 633 days.

(21) Appl. No.: 12/903,226

(22) Filed: Oct. 13, 2010

(65) Prior Publication Data

US 2011/0314985 A1 Dec. 29, 2011

(30) Foreign Application Priority Data

Jun. 29, 2010 (TW) ................................ 99121338 A

(51) Int. Cl.
*B23B 31/00* (2006.01)

(52) U.S. Cl.
USPC ................. 408/71; 408/76; 408/89; 408/204; 269/21

(58) Field of Classification Search
USPC ........ 408/65, 69–71, 76, 89–90, 204; 269/21; 414/225.01, 737; 901/40
See application file for complete search history.

(56) References Cited

U.S. PATENT DOCUMENTS 26,778 A * 1/1860 Mitchell .......................... 408/37
1,970,018 A * 8/1934 Poole ............................... 408/43
2,090,949 A * 8/1937 Richards .......................... 408/71
4,824,310 A * 4/1989 Kosmowski et al. .... 414/222.06
5,246,318 A * 9/1993 Merrill ........................... 408/204
5,354,153 A * 10/1994 Ottone et al. .................. 408/1 R
5,704,262 A * 1/1998 Baumbusch et al. ........... 82/124
7,891,917 B2 * 2/2011 Nulman et al. ............... 408/1 R
7,955,033 B2 * 6/2011 Bando ............................ 408/1 R

FOREIGN PATENT DOCUMENTS

SU 1542780 A * 2/1990 ............. B23Q 39/00

* cited by examiner

*Primary Examiner* — Daniel Howell
*Assistant Examiner* — Chwen-Wei Su
(74) *Attorney, Agent, or Firm* — Altis Law Group, Inc.

(57) ABSTRACT

A cutting apparatus includes a workpiece supplying member, a positioning mechanism, a transportation robot, and an annular cutting blade. The workpiece supplying member includes a number of slots for receiving a number of plate-shaped workpieces therein. The positioning mechanism includes a number of side surfaces and a number of recesses. The transportation robot is configured for unloading a workpiece from the workpiece supplying member, transporting the workpiece from the workpiece supplying member to the positioning mechanism, and loading the workpiece on the positioning mechanism. The positioning mechanism is rotatable about the central axis such that one of the side faces can be selectively oriented to face the transportation robot so as to load the workpiece transported by the transportation robot in the corresponding recess. The cutting blade is configured for cutting a workpiece loaded on the positioning mechanism.

16 Claims, 15 Drawing Sheets

CUTTING APPARATUS

CROSS-REFERENCE TO RELATED APPLICATIONS

This application is related to the following commonly-assigned copending application Ser. No. 12/869,772, entitled "CUTTING DEVICE AND CUTTING APPARATUS HAVING SAME". Disclosure of the above-identified application is incorporated herein by reference.

BACKGROUND

1. Technical Field

The disclosure generally relates to cutting devices and, particularly, to a cutting apparatus with a transportation robot for transporting a workpiece.

2. Description of Related Art

Infrared (IR) cut-off filters are configured to reflect or block mid-infrared wavelengths while passing visible light, and are generally equipped in cameras as key elements thereof. The IR cut-off filters are manufactured by forming IR cut-off films on respective substrates. A roll grinding apparatus is generally used to round and/or polish surfaces of the substrates before or after the IR cut-off films are formed on the substrates.

Referring to FIG. 14 and FIG. 15, a typical roll grinding apparatus includes a grinding wheel 11 and a pair of clamping members 13. In a roll grinding process, the clamping members 13 cooperate to clamp a number of stacked cuboid-shaped substrates 12. The cuboid-shaped substrates 12 clamped by the clamping members 13 are rounded by the grinding wheel 11 into substantially cylindrical substrates 120, as shown in FIG. 15.

Generally, to attain a cylindrical substrate 120 with good circularity, it is necessary for principal axes of the substrates 12 to be coaxially aligned with the two clamping members 13, before the substrates 12 are rounded. However, it is very difficult for the clamping members 13 to be aligned with principal axes of the substrates 12. The substrates 12 may thus result in inferior circularity of the cylindrical substrates 120.

Therefore, what is needed, is a cutting apparatus, which can overcome the above shortcomings

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiment of the cutting apparatus will now be described in detail below and with reference to the drawings.

Figure 1:
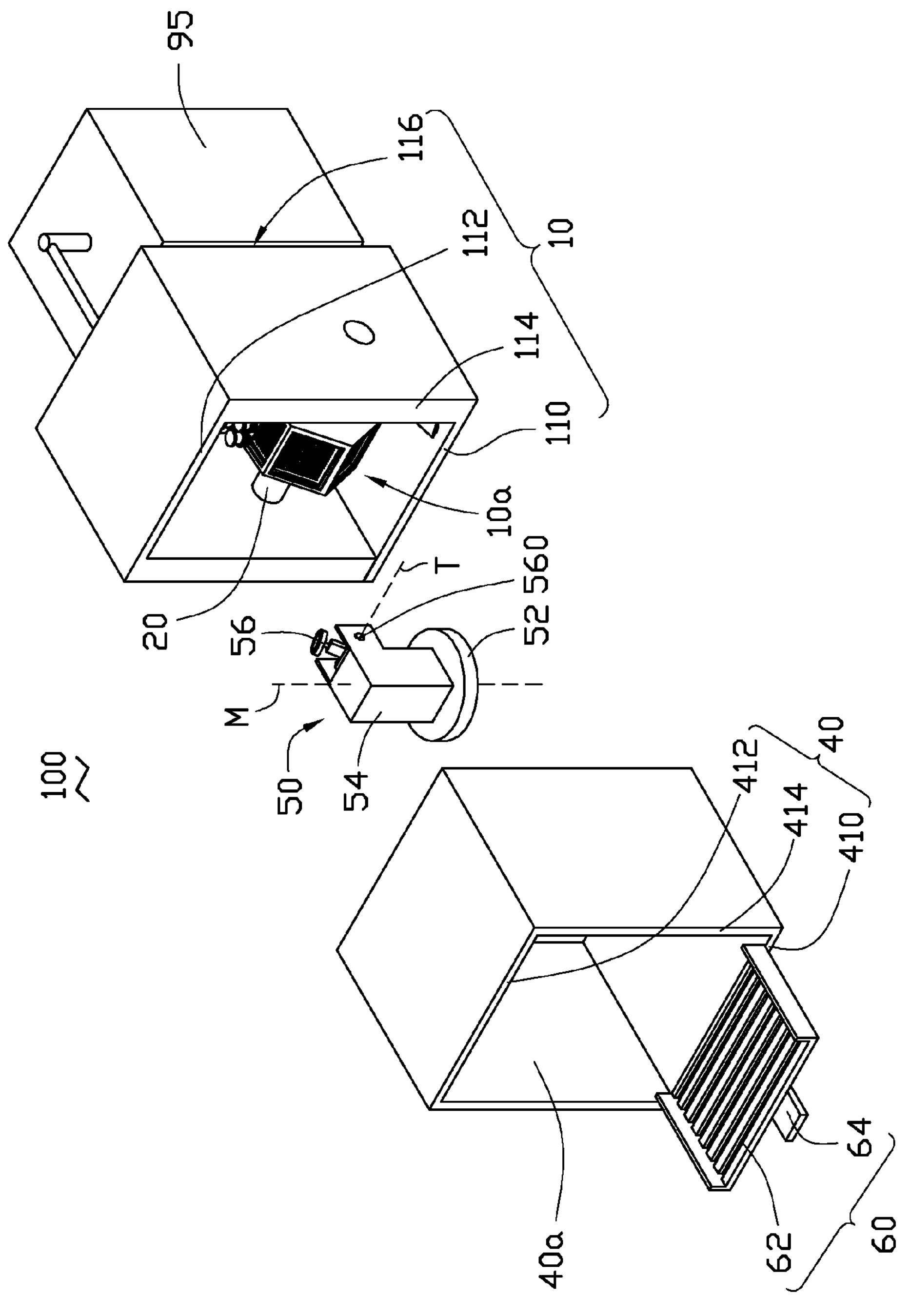
FIG. 1 is a disassembled and isometric front view of a cutting apparatus in accordance with an exemplary embodiment.
Figure 2:
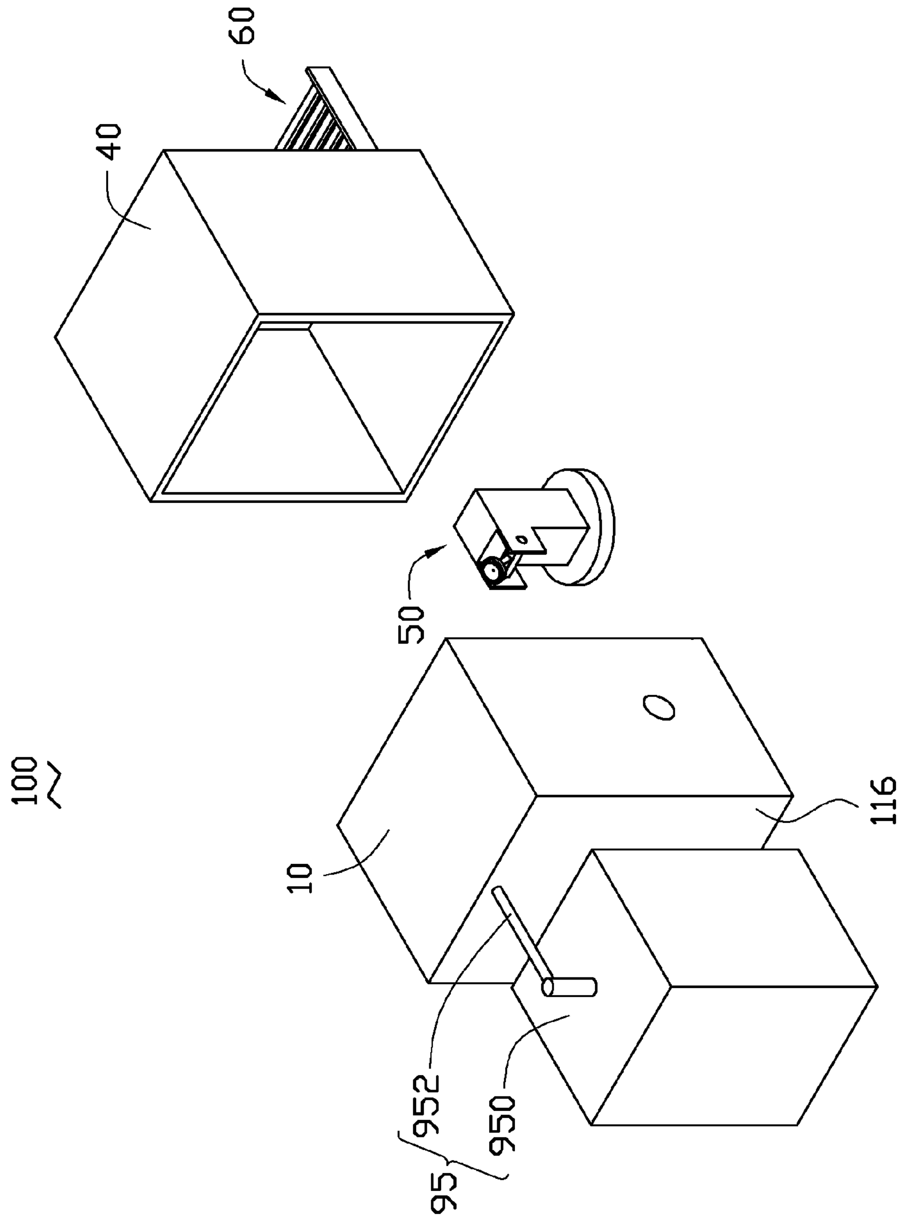
FIG. 2 is a disassembled and isometric rear view of the cutting apparatus of FIG. 1.
Figure 3:
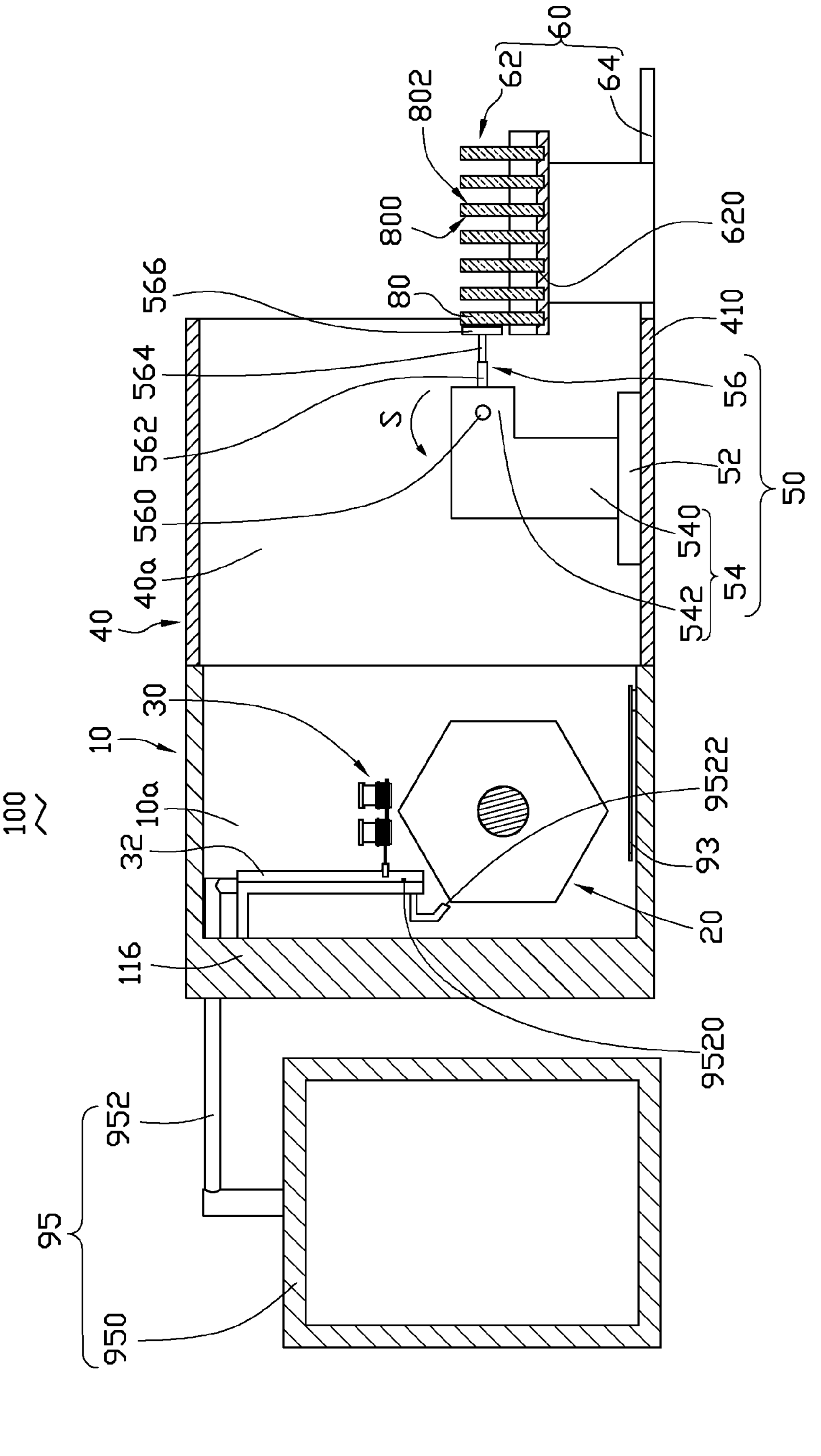
FIG. 3 is an assembled and sectional view of the cutting apparatus of FIG. 1.

Referring to FIG. 1 to FIG. 3, a cutting apparatus 100 in accordance with an exemplary embodiment is shown. The cutting apparatus 100 includes a first chamber 10, a positioning mechanism 20, a number of cutting devices 30, a second chamber 40, a transportation robot 50, and a workpiece supplying member 60.

As shown in FIG. 1, the first chamber 10 is cuboid-shaped. The first chamber 10 includes a first bottom board 110, a first top board 112, two parallel first side boards 114, and a second side board 116. The bottom board 110 is generally parallel to the top board 112. Each of the first side boards 114 is located between and adjoins the first bottom board 110 and the first top board 112. The second side board 116 is located between and adjoins the two first side boards 114, and the second side board 116 is located between and adjoins the first bottom board 110 and the first top board 112. The first bottom board 110, the first top board 112, the first side boards 114, and the second side board 116 cooperatively form a first receiving space 10*a*. The first receiving space 10*a* opens toward the second chamber 40.

The second chamber 40 also is cuboid-shaped, and includes a second bottom board 410, a second top board 412, and two parallel third side boards 414. The bottom board 410 is generally parallel to the top board 412. Each of the third side boards 414 is located between and adjoins the second bottom board 410 and the second top board 412. The second bottom board 410, the second top board 412, and the third side board 414 cooperatively form a second receiving space 40*a*. As shown in FIG. 3, the second chamber 40 is arranged adjacent to the first chamber 10. The second receiving space 40*a* communicates with the first receiving space 10*a*. In addition, an end of the second chamber 40 distant from the first chamber 10 opens toward the loading plate 62.

Figure 4:
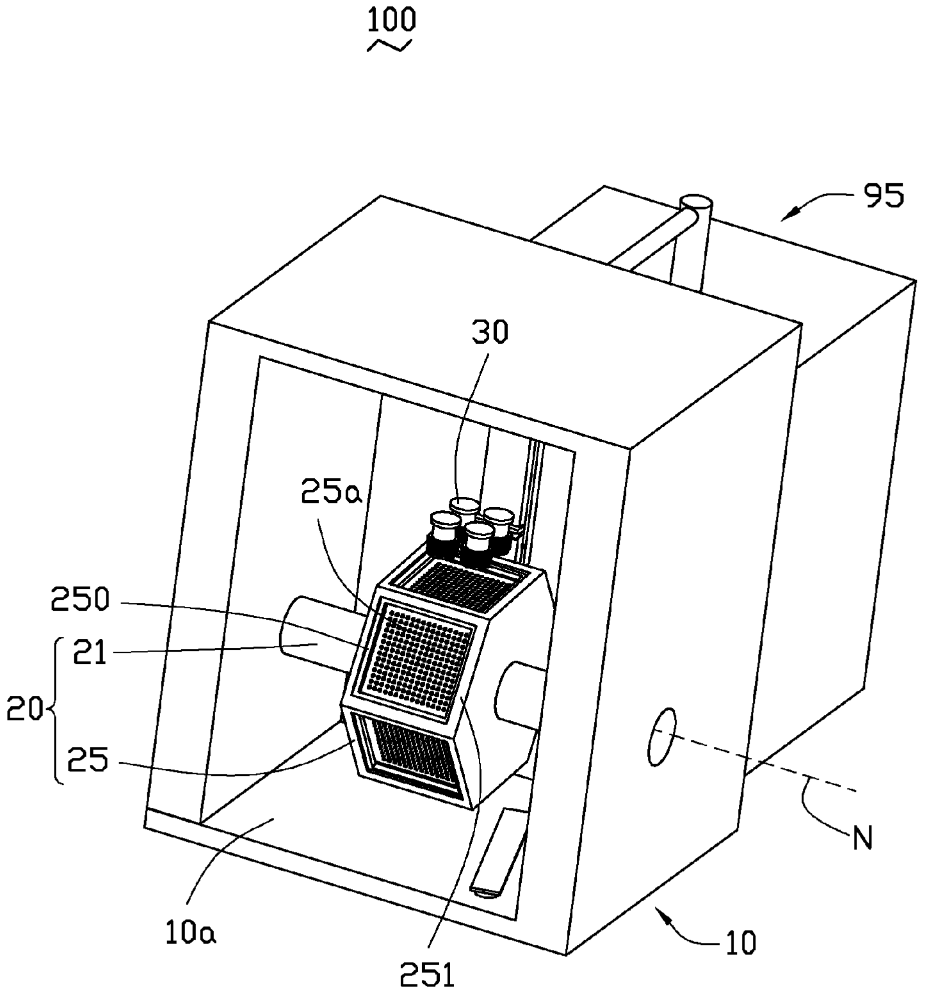
FIG. 4 is an isometric view of a positioning mechanism and a number of cutting devices of FIG. 1.

As shown in FIG. 4, the positioning mechanism 20 is arranged and secured in the first receiving space 10*a* of the first chamber 10. In this embodiment, the positioning mechanism 20 includes a first drive shaft 21 and a supporting frame 25. The first drive shaft 21 is arranged between the two first side boards 114. In a typical example, two opposite ends of the first drive shaft 21 is coupled to the respective first side boards 114. Generally, a motor (not shown) can be provided and coupled to the first drive shaft 21, thus the first drive shaft 21 can be rotated by the motor. The first drive shaft 21 extends through the supporting frame 25, and is used to rotate the supporting frame 25. In this embodiment, the supporting frame 25 is generally a polygonal prism. The first drive shaft 21 is aligned with a central axis N of the supporting frame 25. The central axis N of the supporting frame 25 is a horizontal axis. In alternative embodiments, the supporting frame 25 may have another suitable shape, such as a substantially cylindrical shape.

In this embodiment, the supporting frame 25 is in the form of a chamber with a cavity (not labeled) defined therein. The supporting frame 25 includes a number of side surfaces 251 surrounding the central axis N, and a number of rectangular recesses 250 defined in the respective side surfaces 251. The recesses 250 are configured for receiving the workpieces. Each of the recesses 250 faces out from the supporting frame 25. In this embodiment, the positioning mechanism 20 includes a number of suction nozzles 25*a*. The suction nozzles 25*a* are structured and arranged in each of the recesses 250.

The transportation robot 50 is arranged and secured in the second receiving space 40*a* of the second chamber 40. As shown in FIG. 1 and FIG. 3, in this embodiment, the transportation robot 50 includes a revolving base 52, a supporting post 54, and a pick-up unit 56. The revolving base 52 is arranged on the second bottom board 410 (see FIG. 3). The revolving base 52 is substantially disk-shaped. The supporting post 54 includes a main body 540 and two fixing boards 542. The main body 540 is substantially cuboid-shaped, and is attached to the revolving base 52. The two fixing boards 542 extend parallel from an end of the main body 540 distant from the revolving base 52. The revolving base 52 can be used to rotate the supporting post 54 about a vertical axis M (see FIG. 1). In one typical example, the revolving base 52 can be coupled to a motor (not shown) and rotated by the motor, thus rotating the supporting post 54 thereon.

Figure 5:
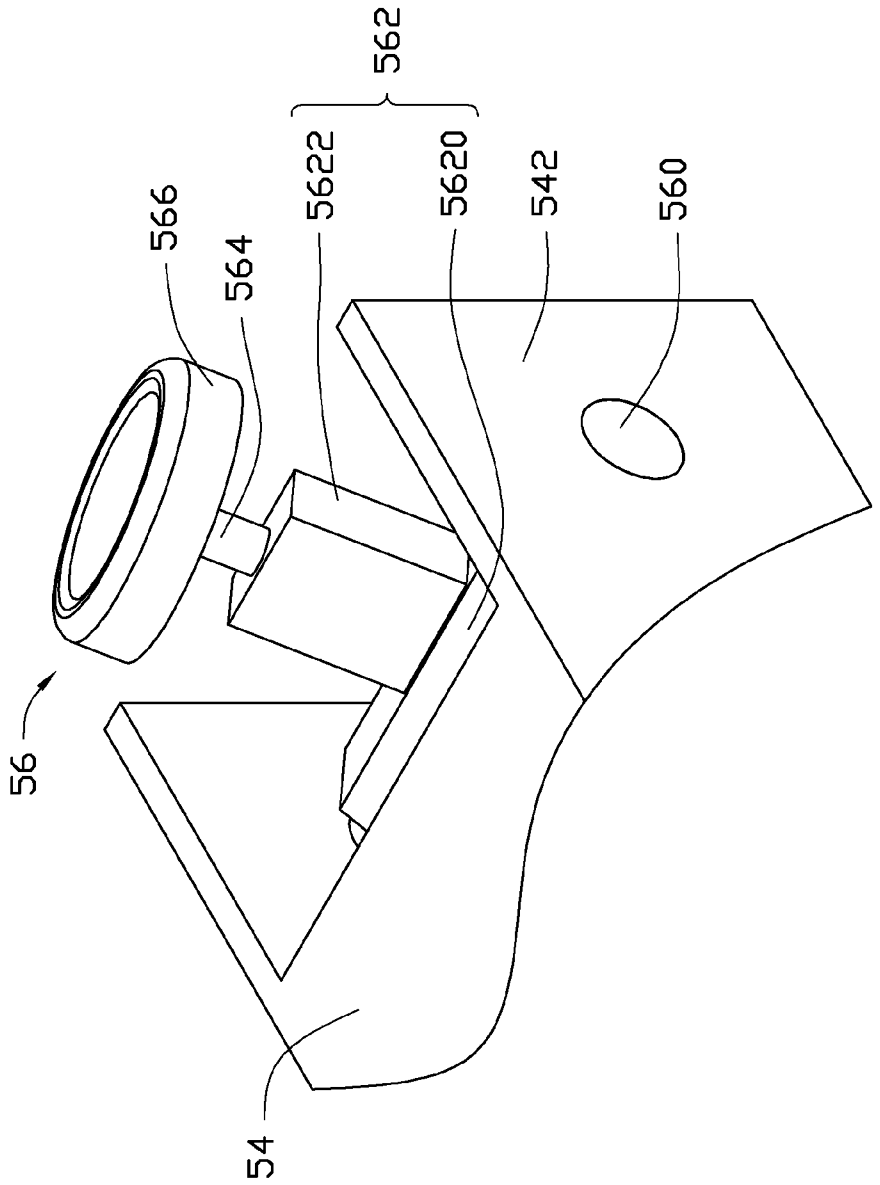
FIG. 5 is an isometric view of a pick-up unit of FIG. 1.
Figure 6:
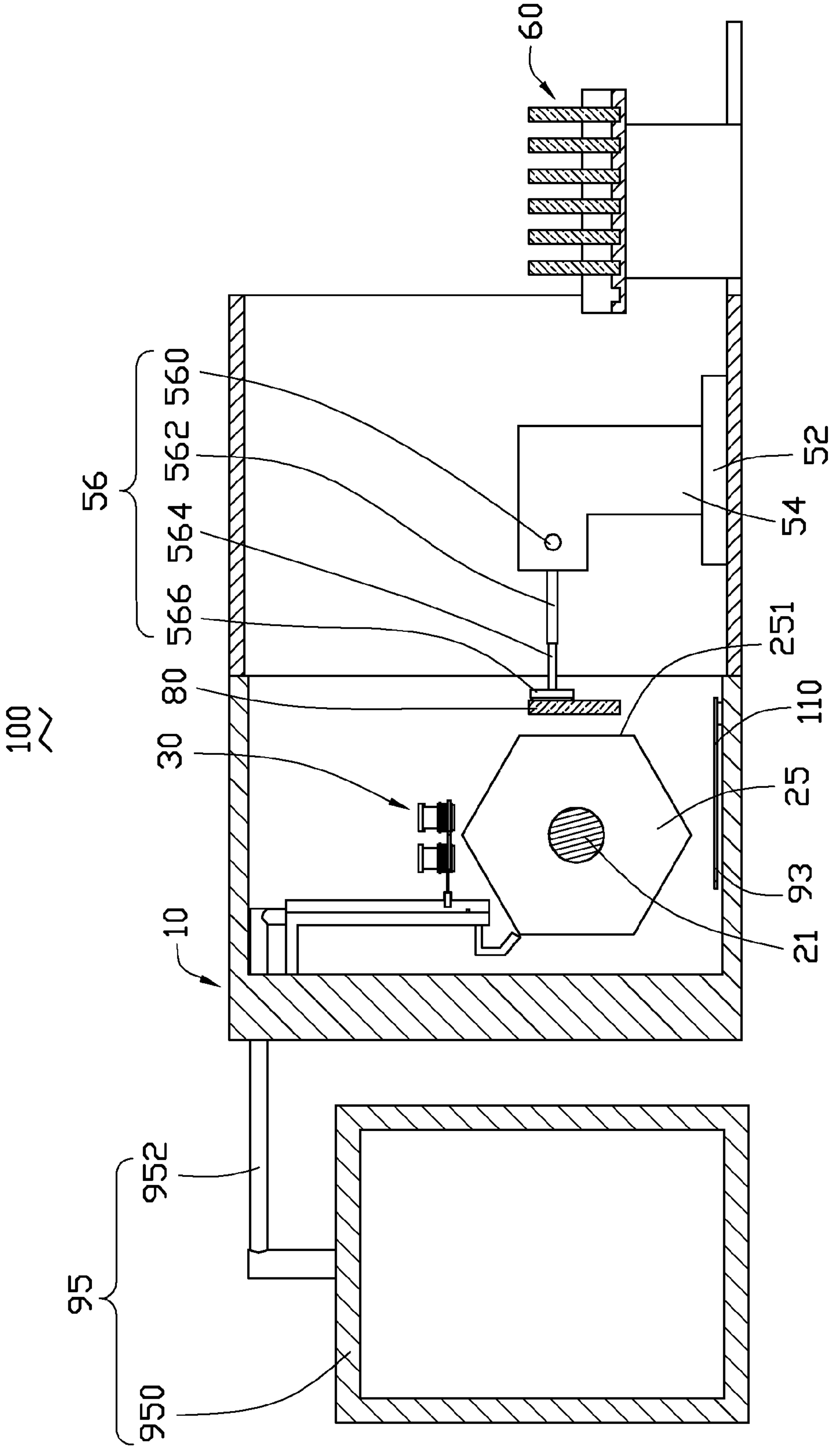
FIG. 6 is a sectional view of the cutting apparatus of FIG. 1, showing a workpiece being transported by a transportation robot to a positioning mechanism.

The pick-up unit 56 is supported on the supporting post 54. As shown in FIG. 5, the pick-up unit 56 includes a second drive shaft 560, a sleeve 562, an arm, and a suction member 566. The second drive shaft 560 is arranged between the two fixing boards 542, and is perpendicular to a vertical axis M of the revolving base 52 (see FIG. 1). That is, the second drive shaft 560 is horizontally oriented. In a typical example, two opposite ends of the second drive shaft 560 are coupled to the two respective fixing boards 542. Generally, a motor (not shown) can be provided and coupled to the second drive shaft 560, thus the second drive shaft 560 can be rotated by the motor about a horizontal axis T (see FIG. 1). The sleeve 562 has a T-shaped configuration, and includes a first sleeve portion 5620 and a second sleeve portion 5622. The first sleeve portion 5620 is arranged around the second drive shaft 560 and coupled to the second drive shaft 560. The second sleeve portion 5622 is distinctly oriented from the first sleeve portion 5620. For example, the second sleeve portion 5622 may for example, extend from a central portion of the first sleeve portion 5620, and be perpendicular to the first sleeve portion 5620. In this embodiment, the arm can be a piston rod 564. The piston rod 564 is partially engaged in the second sleeve portion 5622. The suction member 566 is connected to an end of the piston rod 564 distant from the second drive shaft 560. In this embodiment, the suction member 566 can be made of plastic. In alternative embodiments, the suction member 566 can be made of another suitable material, such as rubber.

Referring to FIG. 3, the workpiece supplying member 60 is arranged at a side of the second chamber 40 distant from the first chamber 10. The workpiece supplying member 60 includes a loading plate 62 and a guide plate 64. The loading plate 62 has a number of receiving slots 620 defined therein. The receiving slots 620 are parallel to one another, and are arranged equidistantly in sequence in a direction facing away from the second chamber 40.

As shown in FIG. 3, one end of the guide plate 70 is connected to the second bottom board 410 of the second chamber 10, and the opposite end of the guide plate 70 extends in a direction facing away from the second bottom board 410. In use, the loading plate 62 can be arranged on the guide plate 70. For example, the loading plate 62 may have an extended recess (not visible) defined in a side thereof facing away from the receiving slots 620 to fittingly receive at least a portion of the guide plate 70. With this configuration, the loading plate 62 can be slidably attached to the guide plate 70.

Figure 7:
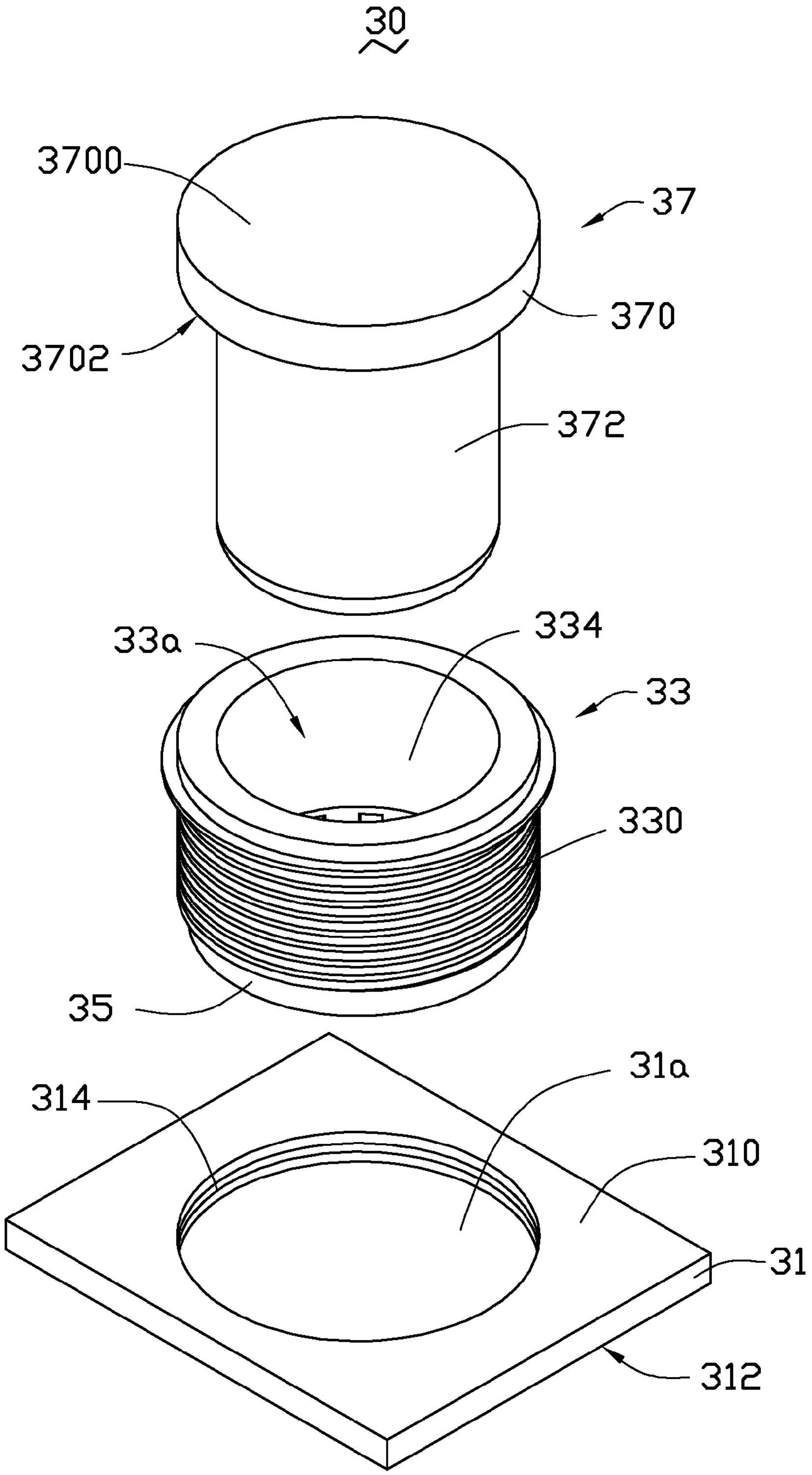
FIG. 7 is a disassembled top view of a single cutting device of FIG. 4.
Figure 8:
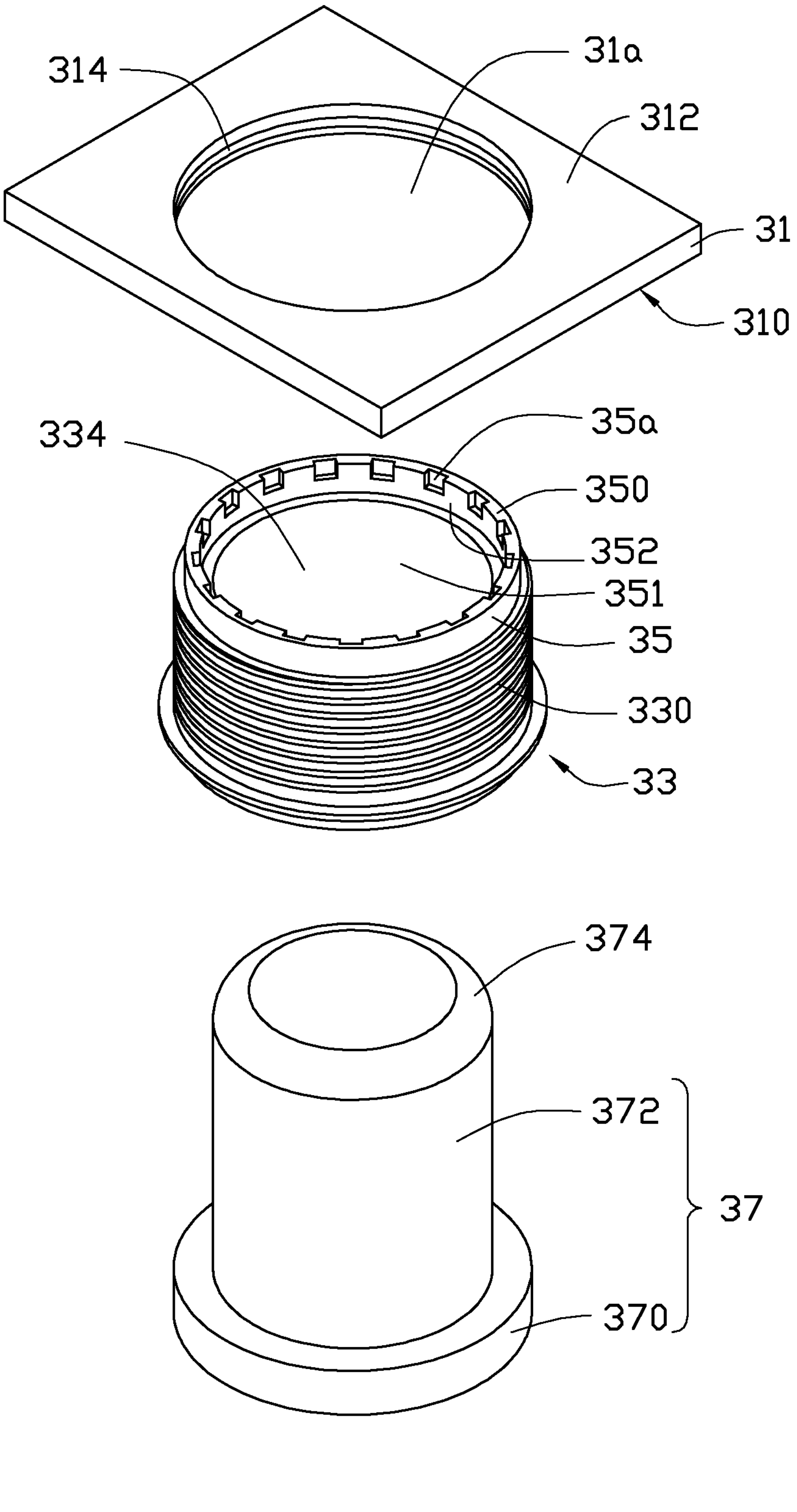
FIG. 8 is a disassembled bottom view of the cutting device of FIG. 4.

Referring to FIG. 1 to FIG. 3, the cutting apparatus 100 includes four cutting devices 30. As shown in FIG. 7 and FIG. 8, each of the cutting devices 30 includes a fixing plate 31, a revolving cylinder 33, a cutting blade 35, and an ejection bar 37. The fixing plate 31 is generally cuboid-shaped, and includes a first surface 310 and a second surface 312 at opposite sides thereof. In this embodiment, the four first surfaces 310 of the four fixing plates 31 are coplanar, and the four fixing plates 31 can be made separately and connected to one another edgewise by applying adhesive therebetween. In alternative embodiments, the four fixing plates 31 can be integrally connected to one another. The four fixing plates 31 are connected to a fixed support 32. The fixed support 32 is fixed to the second side board 116 of the first chamber 10.

The fixing plates 31 has a first through hole 31*a* defined in a central portion of the first surface 310. The first through hole 31*a* extends all the way through the second surface 312. In addition, the fixing plates 31 has interior threads 314 defined in an inner sidewall of the first through hole 31*a*.

The revolving cylinder 33 has a second through hole 33*a* defined in an axial direction thereof (see FIG. 7). An inner sidewall 334 of the second through hole 33*a* is smooth and is not threaded. An external surface (not labeled) of the revolving cylinder 33 has exterior threads 330 defined therein. The exterior threads 330 engage with the interior threads 314. The revolving cylinder 33 is arranged in the first through hole 31*a* and threadedly coupled to the fixing plates 31 by engagement of the interior threads 314 and the exterior threads 330.

The revolving cylinder 33 may be coupled to a motor (not shown) and thus rotated by the motor. The rotation of the revolving cylinder 33 moves the revolving cylinder 33 along the first through hole 31*a* as the exterior threads 330 engage with the interior threads 314.

As shown in FIG. 8, the cutting blade 35 is generally cylindrical and includes an end face 350 facing away from the revolving cylinder 33. The cutting blade 35 has a third through hole 351 defined in the end face 350 along an axial direction thereof. A cross section of the cutting blade 35 is generally annular. In this embodiment, a diameter of the cutting blade 35 is substantially equal to that of the revolving cylinder 33. The cutting blade 35 is attached to an end of the revolving cylinder 33, and the third through hole 351 is coaxially aligned with the second through hole 33*a*. In this embodiment, the cutting blade 35 includes an inner surface 352 in the third through hole 351. The inner surface 352 adjoins the end face 350. The cutting blade 35 has a number of recesses 35*a* defined in the inner surface 352. The recesses 35*a* are dispersed around an axis of the cutting blade 35. Each of the recesses 35*a* is exposed at the end face 350.

Figure 9:
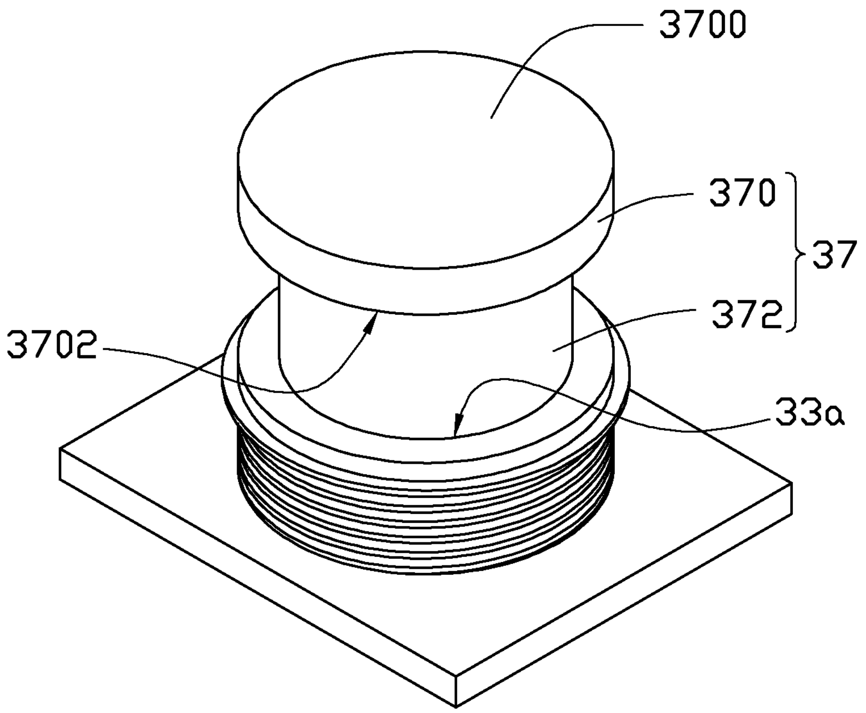
FIG. 9 is an assembled view of the cutting device of FIG. 7.
Figure 10:
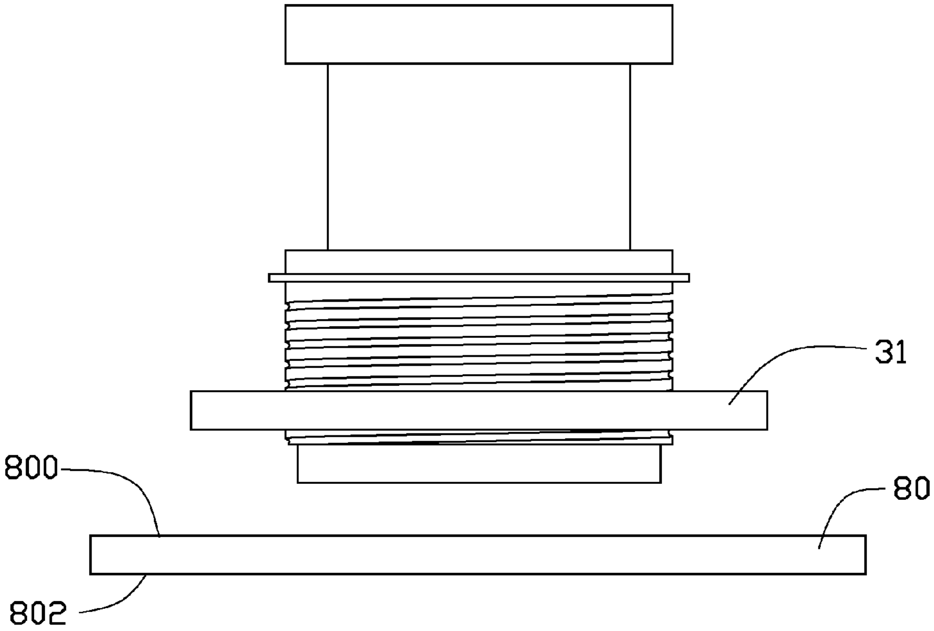
FIG. 10 is a schematic view of the cutting device of FIG. 9 together with a workpiece, showing the workpiece being located in a working position.

Referring also to FIG. 9, the ejection bar 37 includes a base portion 370 and a protruding portion 372. The base portion 370 and the protruding portion 372 each are substantially cylindrical. The base portion 370 includes a first end face 3700 and a second end face 3702 at opposite sides thereof.

The protruding portion 372 protrudes from the second end face 3702. A diameter of the protruding portion 372 is substantially equal to that of the second through hole 33*a*, and is less than that of the base portion 370. Thus, the protruding portion 372 can be inserted in the second through hole 33*a*, as well as the third through hole 351. The base portion 370 can be used to restrain movement of the protruding portion 372 along the second through hole 33*a* and the third through hole 351. In this embodiment, an end 374 of the protruding portion 372 distant from the base portion 370 may have a chamfer or a fillet defined therein (see FIG. 8). Thus, the protruding portion 372 can be easily inserted into the second through hole 33*a*. In this embodiment, the end 374 has a chamfer defined therein. In addition, a suction nozzle (not shown) can be provided to hold the ejection bar 37 by providing a suction force to the first end face 3700. Furthermore, the suction nozzle can be coupled to a cantilever (not shown), thus the ejection bar 37 can be moved by the cantilever to slide the protruding portion 372 along the second through hole 33*a* and the third through hole 351.

The cutting apparatus 100 may include a control unit (not shown) and a cooling device 95. In use, the control unit can be used to control rotation of the first drive shaft 21. In this embodiment, the cooling device 95 includes a storage tank 950 and a tube 952 (see FIG. 2 and FIG. 3). The storage tank 950 is arranged adjacent to the first chamber 10 and configured for receiving coolant such as water. The tube 952 is configured for transporting the coolant and spraying the coolant to the cutting devices 30. The tube 952 can be a pipe or a hose. In this embodiment, the tube 952 is connected to the storage tank 950 and extends through the second side board 116 to a position adjacent to the cutting blades 35. The tube 952 includes a first nozzle 9520 and a second nozzle 9522. The first nozzle 9520 is located at the working position and opens toward the cutting blades 35. The second nozzle 9522 is located adjacent to the supporting frame 25.

As shown in FIG. 3, FIG. 6, and FIG. 10 to FIG. 13, the cutting devices 30 can be used to cut a workpiece 80. In this embodiment, the workpiece 80 can be made of glass. A configuration of the workpiece 80 can be shaped to confirm to the recess 250 of the supporting frame 25. That is, the workpiece 80 is generally cuboid-shaped and plate-shaped. In this embodiment, as shown in FIG. 3, the number of workpieces 80 are provided and arranged on the respective receiving slots 620 of the loading plate 62 in a manner such that the workpieces 80 are vertically oriented. Each of the workpieces 80 has an edge portion inserted in the corresponding receiving slot 620. Each of the workpieces 80 includes a first main surface 800 and a second main surface 802 at two opposite sides thereof. The first main surface 800 is near to the transportation robot 50. The second main surface 802 is further from the transportation robot 50.

In operation, the control unit controls the motor coupled to the revolving base 52 to switch on, and the revolving base 52 is rotated by the motor. Accordingly, the revolving base 52 rotates the supporting post 54 and the pick-up unit 56.

As shown in FIG. 3, when the suction member 566 is pointed towards the workpieces 80 arranged on the loading plate 62, the motor coupled to the second drive shaft 560 can be controlled to switch on, and the second drive shaft 560 can be rotated. Accordingly, the suction member 566 is rotated by the second drive shaft 560 by the piston rod 564. When an axis of the suction member 566 is perpendicular to the first main surface 800 of the workpiece 80, which is nearest to suction member 566, the piston rod 564 extends and moves the suction member 566 toward the workpiece 80, and the suction member 566 can be used to hold the workpiece 80.

When the workpiece 80 is held by the suction member 566, the suction member 566 together with the workpiece 80 can be rotated by the second drive shaft 560 in a counter-clockwise direction S as shown in FIG. 3. The workpiece 80 thus can be detached from the corresponding receiving slot 620. In this embodiment, the piston rod 564 may retract when the workpiece 80 is detached from the receiving slot 620.

When the workpiece 80 is detached from the corresponding receiving slot 620, the control unit controls the revolving base 52 to rotate again. The revolving base 52 rotates the supporting post 54 and the workpiece 80 to another position. For example, in this embodiment, the supporting post 54 and the workpiece 80 may be rotated 180 degrees from a position shown in FIG. 3 to a position shown in FIG. 6. Furthermore, the suction member 566 can be rotated by the second drive shaft 560 by the piston rod 564 to a position where the axis of the suction member 566 is parallel to first bottom board 110 of the first chamber 10. The workpiece 80 held by the suction member 566 thus can be perpendicular to the first bottom board 110.

Moreover, the control unit controls the motor coupled to the drive shaft 21 to switch on, and the drive shaft 21 is rotated by the motor. Accordingly, the drive shaft 21 rotates the supporting frame 25, and the side surfaces 251 are selectively oriented to face the workpiece 80. When any of the side surfaces 251 is vertically oriented and faces the workpiece 80. The piston rod 564 extends again and moves the suction member 566 toward the recess 250 corresponding to the side surface 251. The workpiece 80 thus can be arranged in the recess 250 to cover the recess 250.

When the workpiece 80 is arranged in the recess 250, the control unit controls the motor coupled to the drive shaft 21 to switch on, and the drive shaft 21 is rotated by the motor. Accordingly, the drive shaft 21 rotates the supporting frame 25 and the workpiece 80. When the workpiece 80 surface is oriented toward the fixing plate 31 (see FIG. 10), the workpiece 80 is located at the working position where the workpiece 80 can be cut by the cutting blade 35.

Figure 11:
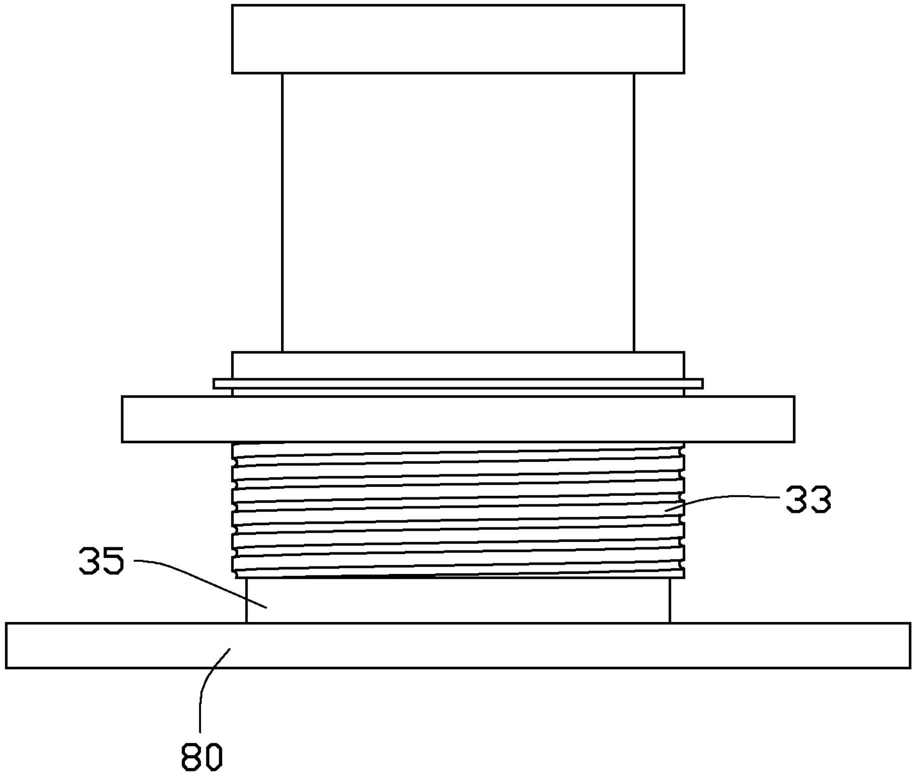
FIG. 11 is similar to FIG. 10, but showing the cutting device operating in an extended position.
Figure 12:
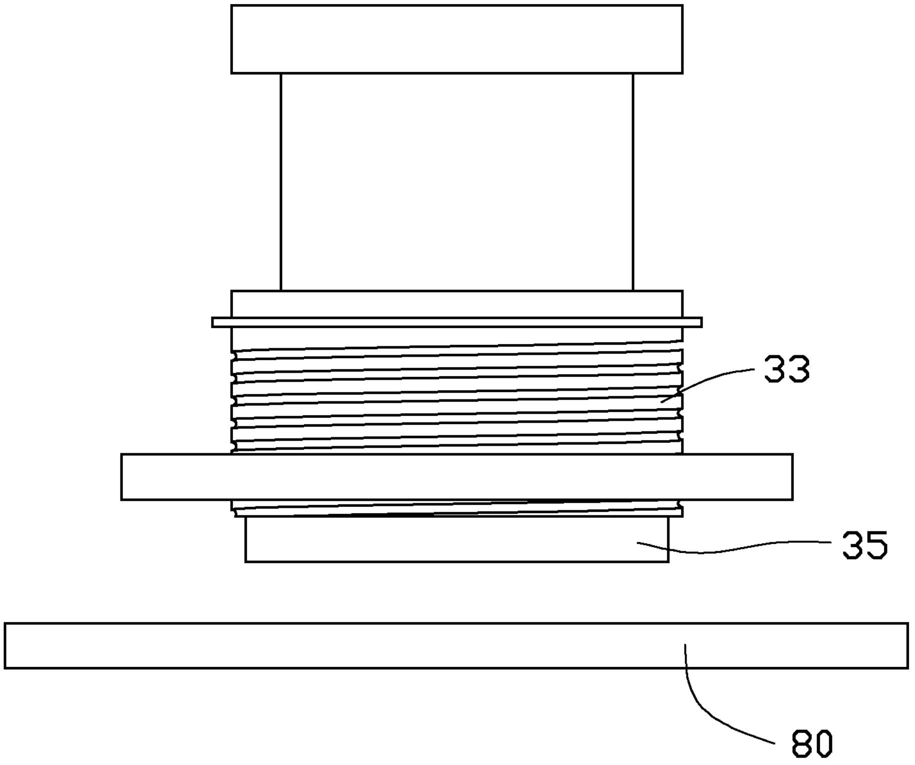
FIG. 12 is similar to FIG. 11, but showing the cutting device operating in an extracted position.
Figure 13:
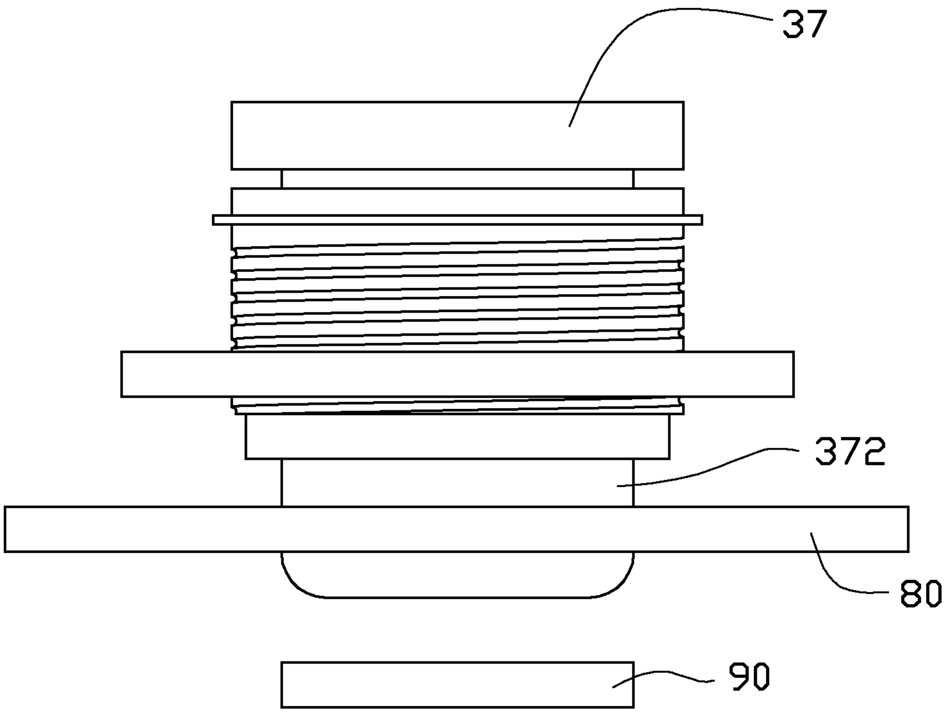
FIG. 13 is similar to FIG. 12, but showing a portion of the workpiece is separated from the entire workpiece.
Figure 14:
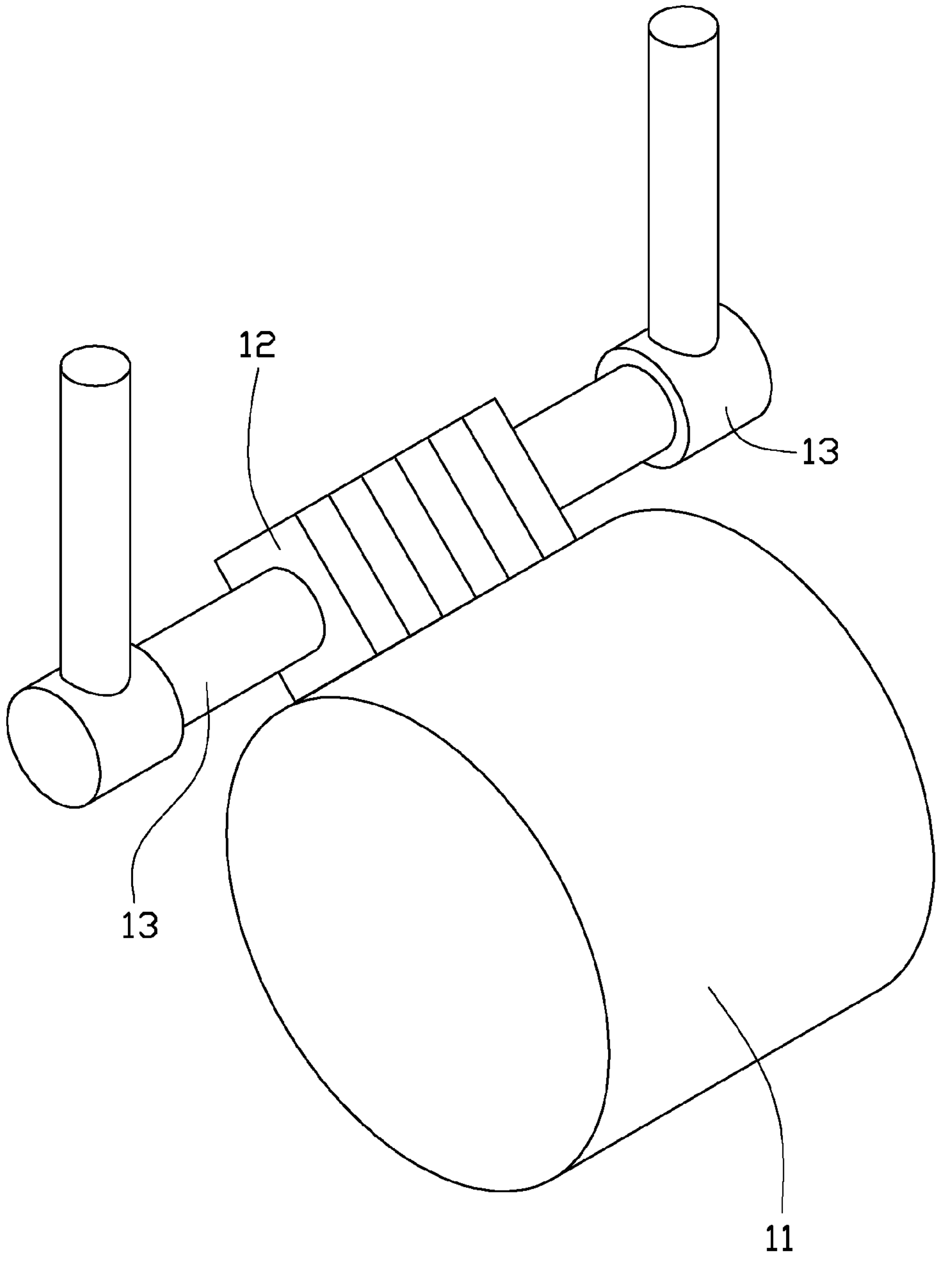
FIG. 14 (RELATED ART)
FIG. 14 is an isometric view of a typical roll grinding apparatus with a number of cuboid-shaped substrates.
Figure 15:
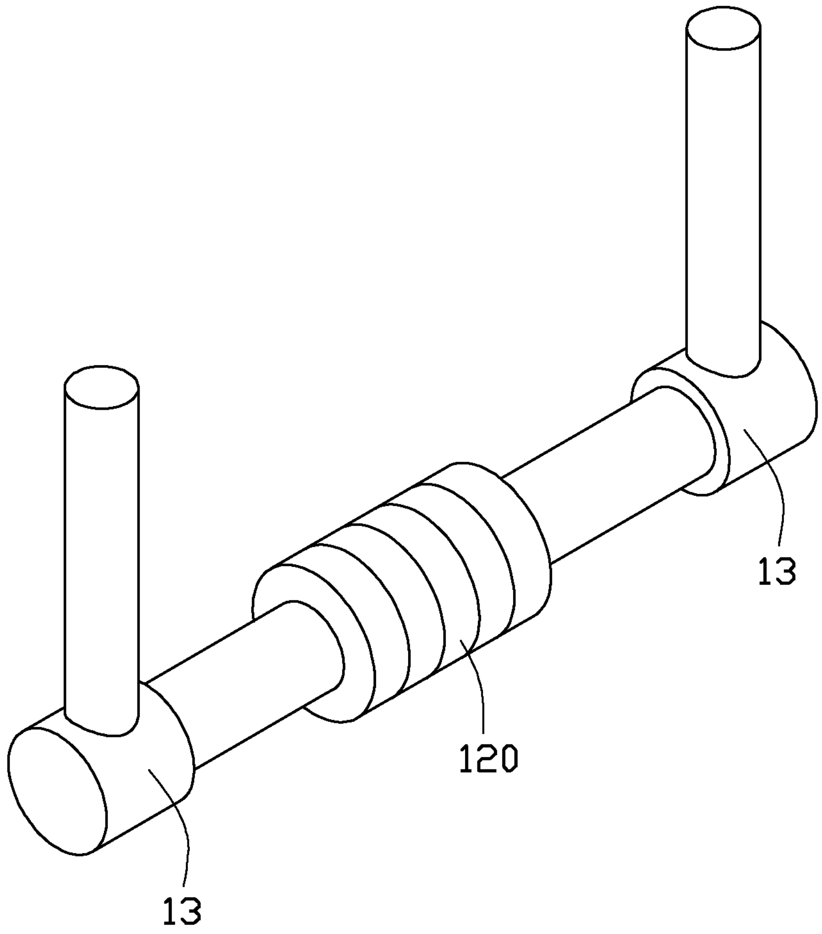
FIG. 15 (RELATED ART)
FIG. 15 is similar to FIG. 14, but showing the cuboid-shaped substrates being shaped into cylindrical substrates.

Referring also to the FIG. 11, when the workpiece 80 is located at the working position, the motor coupled to the revolving cylinder 33 can be used to rotate the revolving cylinder 33 clockwise (or counter-clockwise), thus moving the revolving cylinder 33 toward the workpiece 80. Accordingly, the cutting blade 35 is moved toward the workpiece 80 by the revolving cylinder 33 to an extended position where the cutting blade 35 cuts the workpiece 80. In this embodiment, the cutting blade 35 rotates when cutting the workpiece 80. As mentioned, the cutting apparatus 100 includes four cutting devices 30 and the four cutting blades 35 can be rotated by the four respective motors to cut the workpiece 80 simultaneously, thus cutting four respective portions 90 (as shown in FIG. 13) out of the workpiece 80. The portion 90 is generally cylindrical. A diameter of each portion 90 is equal to that of cutting blade 35 measured in the third through hole 351.

In this embodiment, the workpiece 80 is relatively thick, the cutting blade 35 can be used to cut the workpiece 80 to create a round blind crack in the first main surface 800 of the workpiece 80. The blind crack has a predetermined depth and does not extend all the way through the second main surface 802. The portion 90 is surrounded by the blind crack and partially connected to the workpiece 80. Furthermore, as shown in FIG. 11, the motor can be used to rotate the revolving cylinder 33 in a reverse direction, moving the cutting blade 35 to an extracted position where the cutting blade 35 is backed away from the workpiece 80.

As shown in FIG. 13, when the cutting blade 35 is located in the extracted position, the ejection bar 37 can be used to push the portion 90 out of the workpiece 80. The portion 90 falls off toward the supporting frame 25. When the portion 90 is arranged in any of the recesses 25, the suction nozzle 25*a* can be used to provide a suction force to hold the portion 90 on the supporting frame 25.

In alternative embodiments, the workpiece 80 may be relatively thin, the cutting blade 35 can be used to cut the workpiece 80 all the way through the second main surface 802, and the portion 90 can be directly separated from the workpiece 80.

Furthermore, the control unit can be used to control the first drive shaft 21 to rotate the supporting frame 25 again. During rotation of the supporting frame 25, the transportation robot 50 can be used to transport another workpiece 80 from the loading plate 62 to the supporting frame 25 in a manner described above. In addition, another recess 250 which is adjacent (or neighboring) to the previous recess 250 may point toward to the transportation robot 50 to receive another workpiece 80. The another workpiece 80 can be rotated by the supporting frame 25 to locate at the working position. The four cutting devices 30 can be used to cut the another workpiece 80 in a similar process as cutting the previous workpieces 80.

In this embodiment, when the portion 90 held is rotated away from the second side board 116 of the first chamber 10, the suction nozzle 25*a* can be switched off to stop providing suction. The portion 90 can thus be held by, for example, a suction nozzle and moved out of the first chamber 10. When the workpiece 80 (the portion 90 has been separated from the workpiece 80) is rotated toward the first bottom board 110, the workpiece 80 can be detached from the supporting frame 25 and due to gravity, it falls off to the first bottom board 110. In such case, a clean up member, such as a brush 93 (see FIG. 3) can be provided to clean up the workpieces 80 out of the first receiving space 10*a* of the first chamber 10.

While cutting the workpiece 80, the cooling device 95 can be used to cool the cutting blade 35 and the workpiece 80, thus the workpiece 80 can be prevented from overheating. In this embodiment, when the cutting blade 35 cuts the workpiece 80, the coolant is sprayed from the first nozzle 9520 to the cutting blade 35 and the workpiece 80 to cool the cutting blade 35 and workpiece 80. The coolant can be used to wash away chips, which are generated when the cutting blade 35 cuts the workpiece 80. In addition, when the portion 90 is rotated to a location adjacent to the second nozzle 9522, the coolant can be sprayed from the second nozzle 9522 to clean the portion 90, thus ensuring the portion 90 to have a good surface cleanliness.

In this embodiment, the portion 90 can be used to manufacture an infrared (IR) cut-off filter by forming IR cut-off films on a surface thereof. In alternative embodiments, the portion 90 may be used in another application, for example, the portion 90 can be machined to be a lens.

One advantage of the cutting apparatus 100 is that the cross section of the cutting blade 35 is annular, thus a round portion 90 with good circularity can be cut from the portion 90 by using the cutting blade 35, and the portion 90 can be separated from the portion 90 by the ejection bar 37. Another advantage of the cutting apparatus 100 is that the recesses 35*a* defined in the cutting blade 35 can be used to receive the chips, thus the portion 90 is protected from being damaged or polluted by the chips. In addition, in this embodiment, the suction member 566 can be rotated by the revolving base 52 and the second drive shaft 560, and moved by the piston rod 564, thus the suction member 566 can be flexible in holding the workpiece 80 and moving the workpiece 80.

It is understood that the above-described embodiment are intended to illustrate rather than limit the disclosure. Variations may be made to the embodiment without departing from the spirit of the disclosure. Accordingly, it is appropriate that the appended claims be construed broadly and in a manner consistent with the scope of the disclosure.

What is claimed is:

1. A cutting apparatus for cutting plate-shaped workpieces, the cutting apparatus comprising:

a workpiece supplying member including a plurality of slots for receiving a plurality of plate-shaped workpieces therein, and the slots being structured and arranged in a manner such that the workpieces are vertically oriented and edge portions thereof are inserted in the slots;

a positioning mechanism having a central axis, the positioning mechanism comprising a plurality of side faces surrounding the central axis, and a plurality of recesses defined in the respective side faces for receiving workpieces therein;

a transportation robot configured for unloading a workpiece from the workpiece supplying member, transporting the workpiece from the workpiece supplying member to the positioning mechanism, and loading the workpiece on the positioning mechanism, the positioning mechanism being rotatable about the central axis such that one of the side faces can be selectively oriented to face the transportation robot so as to load the workpiece transported by the transportation robot in the corresponding recess; and an annular cutting blade configured for cutting a workpiece loaded on the positioning mechanism, the positioning mechanism being rotatable about the central axis such that one workpiece loaded thereon can be selectively oriented to face the cutting blade.

2. The cutting apparatus of claim 1, wherein the transportation robot comprises an extendable and retractable arm and a suction member attached to the arm, the sucking member configured for holding a workpiece thereto.

3. The cutting apparatus of claim 2, wherein the arm is rotatable about a horizontal axis.

4. The cutting apparatus of claim 2, wherein the arm is rotatable about a vertical axis.

5. The cutting apparatus of claim 1, wherein the workpiece supplying member is movable toward or away from the transportation robot.

6. The cutting apparatus of claim 1, wherein the central axis of the positioning mechanism is a horizontal axis.

7. The cutting apparatus of claim 2, wherein the suction member is configured for gripping a first main surface of the workpiece.

8. The cutting apparatus of claim 7, wherein the positioning mechanism comprises a suction nozzle arranged in each recess for gripping a second main surface of the workpiece facing away from the first main surface thereof.

9. The cutting apparatus of claim 7, wherein the transportation robot is configured for loading the transported workpiece on the positioning mechanism in a manner that the first main surface of the workpiece faces away from the corresponding recess.

10. The cutting apparatus of claim 1, wherein the positioning mechanism is rotatable about the central axis to a position where said one of the side faces is vertically oriented so as to load the workpiece transported by the transportation robot in the corresponding recess.

11. A cutting apparatus for cutting plate-shaped workpieces, the cutting apparatus comprising:

a workpiece supplying member including a plurality of slots for receiving a plurality of plate-shaped workpieces therein, and the slots being structured and arranged in a manner such that the workpieces are vertically oriented;

a positioning mechanism having a horizontally oriented central axis, the positioning mechanism comprising a plurality of side faces surrounding the central axis, and a plurality of recesses defined in the respective side faces for receiving workpieces therein;

a transportation robot configured for unloading a workpiece from the workpiece supplying member, transporting the workpiece from the workpiece supplying member to the positioning mechanism, and loading the workpiece on the positioning mechanism, the transportation robot comprising an extendable and retractable arm and a suction member attached to the arm, the arm being rotatable about a horizontal axis and a vertical axis, the sucking member being configured for holding a workpiece thereto, the positioning mechanism being rotatable about the central axis such that one of the side faces can be selectively oriented to face the transportation robot so as to load the workpiece transported by the transportation robot in the corresponding recess; and an annular cutting blade configured for cutting a workpiece loaded on the positioning mechanism, the positioning mechanism being rotatable about the central axis such that one workpiece loaded thereon can be selectively oriented to face the cutting blade.

12. The cutting apparatus of claim 11, wherein the workpiece supplying member is movable toward or away from the transportation robot.

13. The cutting apparatus of claim 11, wherein the suction member is configured for gripping a first main surface of the workpiece.

14. The cutting apparatus of claim 13, wherein the positioning mechanism comprises a suction nozzle arranged in each recess for gripping a second main surface of the workpiece facing away from the first main surface thereof.

15. The cutting apparatus of claim 13, wherein the transportation robot is configured for loading the transported workpiece on the positioning mechanism in a manner that the first main surface of the workpiece faces away from the corresponding recess.

16. The cutting apparatus of claim 11, wherein the positioning mechanism is rotatable about the central axis to a position where said one of the side faces is vertically oriented to load the workpiece transported by the transportation robot in the corresponding recess.

* * * * *